United States Patent
Godinez et al.

(10) Patent No.: US 11,080,357 B2
(45) Date of Patent: Aug. 3, 2021

(54) DYNAMIC EDGE CONTENT PERSONALIZATION

(71) Applicant: BBY SOLUTIONS, INC., Richfield, MN (US)

(72) Inventors: Sean Godinez, Woodbury, MN (US); Michael Boldischar, Lino Lakes, MN (US); Praveen Kotla, Apple Valley, MN (US); David Adolphson, Apple Valley, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 21 days.

(21) Appl. No.: 16/271,274

(22) Filed: Feb. 8, 2019

(65) Prior Publication Data

US 2020/0257743 A1 Aug. 13, 2020

(51) Int. Cl.
| | |
|---|---|
| *G06F 16/958* | (2019.01) |
| *H04L 29/08* | (2006.01) |
| *G06F 16/9535* | (2019.01) |
| *G06F 9/54* | (2006.01) |

(52) U.S. Cl.
CPC ............ *G06F 16/958* (2019.01); *G06F 9/547* (2013.01); *G06F 16/9535* (2019.01); *G06F 16/972* (2019.01); *H04L 67/02* (2013.01); *H04L 67/2842* (2013.01); *H04L 67/306* (2013.01)

(58) Field of Classification Search
CPC .. G06F 16/958; G06F 16/972; G06F 16/9535; G06F 16/9574; G06F 16/957; G06F 9/547; H04L 67/02; H04L 67/10; H04N 21/23106; H04N 21/251; G06Q 30/0251; G06Q 30/0269; G06Q 30/0255
See application file for complete search history.

(56) References Cited

U.S. PATENT DOCUMENTS

| | | | |
|---|---|---|---|
| 6,976,090 B2 | 12/2005 | Ben-Shaul et al. | |
| 9,497,496 B1 | 11/2016 | Corley et al. | |
| 2003/0188016 A1 | 10/2003 | Agarwalla et al. | |
| 2004/0015538 A1* | 1/2004 | Agarwalla | H04L 67/2842 709/203 |
| 2004/0098315 A1* | 5/2004 | Haynes | G06Q 30/0633 705/80 |
| 2010/0095197 A1* | 4/2010 | Klevenz | G06F 16/972 715/234 |

(Continued)

*Primary Examiner* — Barbara B Anyan
(74) *Attorney, Agent, or Firm* — Schwegman Lundberg & Woessner, P.A.

(57) ABSTRACT

Systems and techniques for dynamic edge content personalization are described herein. A request for a webpage may be received from a content delivery network for a user. Callback instructions may be generated for a user fragment and a webpage fragment. The webpage may be configured using a webpage template. A set of personalized content fragments may be received that correspond to the webpage template. A personalized content fragment may be selected for the user from the set of personalized content fragments using the callback instructions for the user fragment. The personalized content fragment may be transmitted to the content delivery network. The content delivery network may use the personalized content fragment and callback instructions for the webpage to render and deliver the webpage to the user.

21 Claims, 5 Drawing Sheets

(56) References Cited

U.S. PATENT DOCUMENTS

2011/0307561 A1* 12/2011 Gao ..................... H04H 20/42
                                                                709/206
2013/0246570 A1   9/2013 Raciborski et al.
2013/0332814 A1  12/2013 Marlow

* cited by examiner

DYNAMIC EDGE CONTENT PERSONALIZATION

TECHNICAL FIELD

Embodiments described herein generally relate to edge webpage content delivery and, in some embodiments, more specifically to dynamic edge content personalization.

BACKGROUND

Webpage content may be provided by a webserver. Webpage visitors may access the web content from around the world. Caching webpage content on edge servers closer to the visitors may increase the speed of rendering webpages and may reduce the processing cost of serving webpages by reducing the load on the webserver and reducing the distance the number of routers that the content traverses. However, cached content may become stale which may result in the visitor receiving outdated content. This leads to a significant tradeoff for websites which wish to provide content that is frequently changing or personalized.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Edge caching of web page content items (e.g., serving copies of content from a distributed content delivery network that hosts data centers closer to the user, etc.) may result in faster web content delivery to the user and reduced bandwidth utilization across the internet backbone. The reduction in long distance traffic may also reduce costs for content providers. However, content stored in an edge cache may be stored for general consumption by website visitors. Personalization of web content may provide website visitors with more relevant content that may result in increased engagement of the website visitor. Because edge cached webpage fragments may be for general consumption, visitors may receive similar content when visiting the website.

The subject matter described herein maintains the benefit of serving web pages to visitors as fast as possible using the edge cache while providing webpage personalization for website visitors. Having an entire web page (or a large percentage of the web page) served directly to the customer from a content delivery network (CDN) hosting the edge cache may be the fastest technique for delivering the web page to a visitor. Serving content directly from the CDN may result in cost savings because there may be less traffic to internal application servers of a content provider, and a reduction in the amount of time needed to process client requests. The integration of the present systems and techniques with current techniques and platforms may enable serving a large portion of website traffic from the CDN to provide a number of unique benefits.

Traditional webpage content personalization techniques may personalize requests for content by taking user characteristics or session information on the content request and deciding what to deliver from the content server, often at a remote cloud system, based on those personalized attributes. In contrast, the systems and techniques described herein use conditional logic to determine what content to provide to a user and transmit the conditions to the CDN to be compared against user and session attributes that correspond to a content identifier. A resulting cache key is provided for each content identifier and there is a one-to-one mapping versus a set of many-to-one possibilities.

Traditional webpage content personalization techniques may use complex server infrastructure for applications on timelined content or to address cold-cache (e.g., empty cache, stale cache, etc.) scenarios. If a large number of requests are served, personalizing each request may not be possible without pre-scaling infrastructure for serving content prior to expected cold-cache scenarios. Even without cold-cache scenarios, there could be millions of unique requests to origin for each request that has parameters based on the user or session. The variation in values for each parameter is a multiplier to the number of possible cache keys. As more granularity is added to each request, there will be a point where each request would become unique to the user, at which point caching may not be beneficial at all except in scenarios where a specific user hits their own cache key. The present subject matter reduces cache-key explosion (e.g., the generation of excessive cache keys, etc.) and the number of requests to origin by using conditional logic to identify personalized content fragments rather than user characteristics or session information.

Traditional techniques for webpage content personalization may limit the number of personalized variations in page content available because of the multiplier effect of cache key generation using user characteristics or session information because of increased processing load. For example, hundreds of millions of variations of content may be generated at the CDN per page request based on user and session specific data. The present subject matter allows a content provider to increase the amount of personalized content available to users by reducing the content variations generated at the CDN. Thus, more personalized variations in page content may be generated. For example, there may be more page variations available than there are actual users of a website.

The systems and techniques described herein address a request to dynamically construct a page that is most relevant to a user by resolving the intersection of user interests and characteristics with available content at the CDN in a way that is highly cacheable. Content is not cached under user characteristics so information about the user is not passed in the request for content, but rather the content and/or experience identifier is passed in the request for content. This separates managed content that is highly cacheable from highly cacheable user information that would be poorly cacheable if combined. Requesting content by a content identifier results in better performance in a content caching system than requesting content under a content identifier and a user identifier.

A Content Management System (CMS) may provide a content manager as a way to build a general layout of a webpage as well as describe sections of the webpage that may be hydrated (e.g., populated, defined, etc.) with user-relevant content at runtime. These sections may reference a pool of content where each content item in the pool is identified by a globally unique identifier (GUID) and user-characteristic descriptors/tags. A User Classification Resource (UCR) may assign user personas and propensity tags to each recognized user. The CDN may provide edge caching and an ability to execute edge-side include (ESI) logic at the edge. Fragments of logic and content executing at the CDN may be managed as well as retrieval of user information and managed content. Poorly cacheable user data may be abstracted from highly cacheable managed content by retrieving each separately and performing intersections at the CDN.

Figure 1:
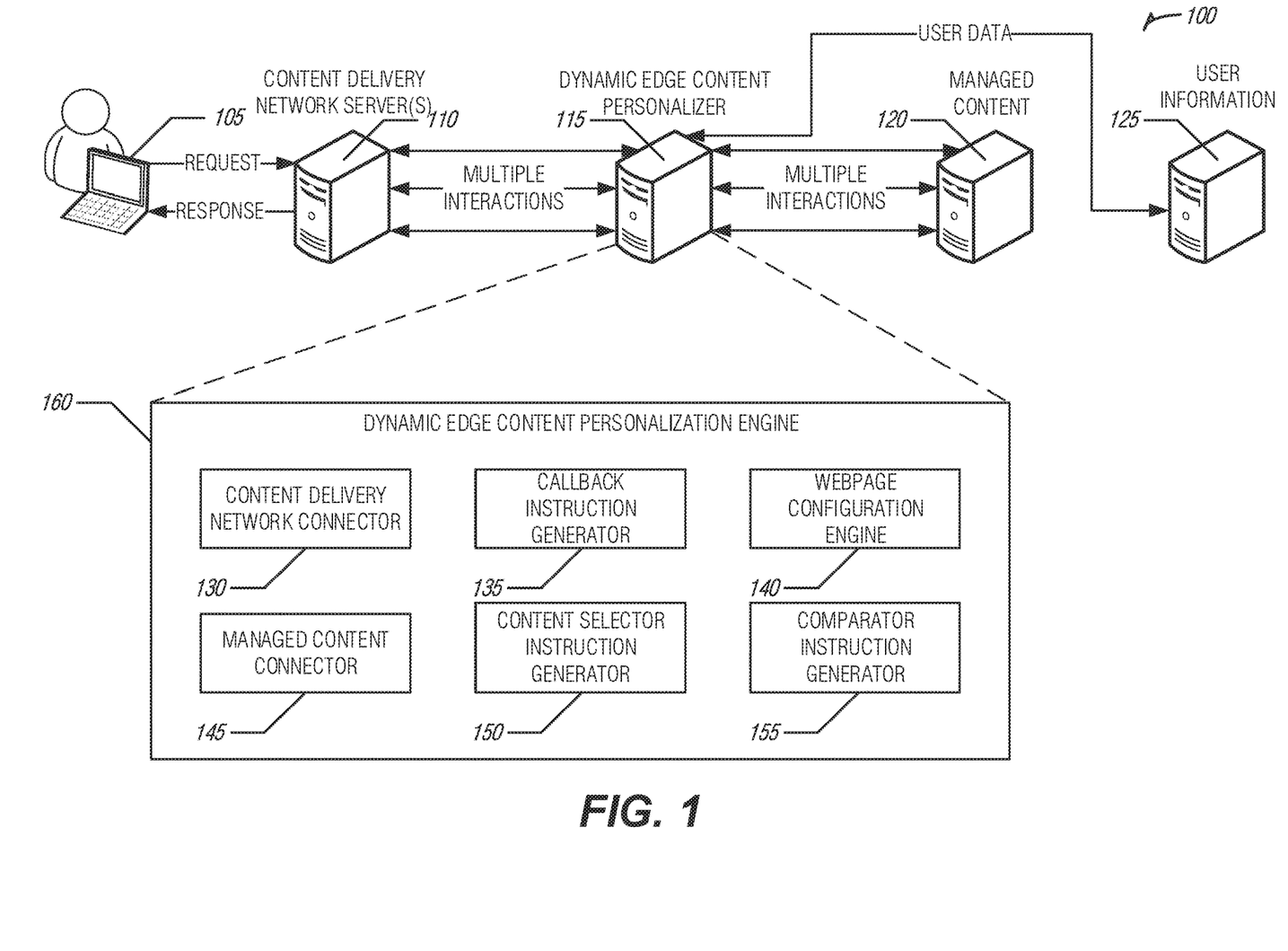
FIG. 1 is a block diagram of an example of an environment and system for dynamic edge content personalization, according to an embodiment.

FIG. 1 is a block diagram of an example of an environment 100 and system 160 for dynamic edge content personalization, according to an embodiment. The environment 100 may include a user requesting a webpage using a computing device 105. The content of the webpage may be served from content delivery network server(s) 110. A dynamic edge content personalizer 115 may be communicatively coupled (e.g., via wired network, wireless network, the internet, etc.) to the content delivery network server(s) 110 and managed content servers 120. The dynamic edge content personalizer 115 may work in conjunction with the content delivery network server(s) 110 and the managed content servers 120 to provide personalized web content for the user based on user information retrieved from user information provider 125. The dynamic edge content personalizer 115 may include the system 160. In an example, the system 160 may be a dynamic edge content personalization engine. The system 160 may include a variety of components such as a content delivery network connector 130, a callback instruction generator 135, a webpage configuration engine 140, a managed content connector 145, a content selector instruction generator 150, and a comparator instruction generator 155.

A content delivery network (CDN) (e.g., including the content delivery network server(s) 110) may receive the webpage request from the user (e.g., via computing device 105) for a webpage. The content for the webpage may originate from a managed content provider (e.g., hosting the managed content servers 120). The content may be cached in an edge cache of the content delivery network so that when a request for the webpage is received, the content for the webpage is rendered and delivered from an edge cache closest (e.g., in distance, time, cost, etc.) to the user. The close proximity of the content to the user increases the performance of content delivery to the user.

A content provider may offer the user personalized content items that may be of particular interest to the user. To facilitate delivery of the personalized content to the user, the content may be selected from a pool of available content provided to the CDN from the managed content provider. A CDN may not have the logic for selecting a content item for a user so content selection logic may be transmitted to the CDN in callback instructions that allow the CDN to resolve a content item to a content identifier based on the instructions. The instructions may include conditional logic for selecting content items from the content pool based on attributes of the user (e.g., interests, propensities, location, demographic information, tags, etc.). The user attributes may be matched to content items based on the conditional logic provided in the instructions.

The content delivery network connector 130 may establish communication between the content delivery network server(s) 110 and the system 160 (e.g., via the dynamic edge content personalizer 115). A request may be received by the content delivery network connector 130 for a webpage from the content delivery network for the user. For example, the user may be requesting a home page of an online retailer that includes a variety of base webpage fragments and personalized content fragments. The base webpage fragments may represent content for general consumption by visitors of the webpage. The personalized content fragments may represent content that may be variable based on the user that is requesting the webpage. For example, all users may receive the base page fragments while three different users may receive three different versions of the personalized content fragment. For example, users Tom, Mary, and Sally may all receive base webpage fragment A. In the example. Tom may receive personalized content fragment B. Mary may receive personalized content fragment C, and Sally may receive personalized content fragment D. Thus. Tom. Mary, and Sally have received the same base webpage content fragment while each receiving a different personalized content fragments.

The callback instruction generator 135 may generate callback instructions for a personalized content fragment (e.g., personalized content, etc.) and a webpage fragment (e.g., general content, etc.) to be rendered in the requested webpage. The callback instructions may be transmitted to the CDN for use in selecting the webpage fragments and the personalized content fragments of which the webpage may be comprised. The callback instructions may use user data (e.g., user information in edge variables, etc.) for selection of personalized content fragments from the managed content servers 120.

In an example, user identification information may be obtained for the user. The managed content connector 145 may establish communication between the managed content servers 120 and the system 160. The managed content connector 145 may provide a flow of user information, webpage content, configuration data, and the like between the managed content servers 120 and the system 160. The user identification information may be transmitted to a user information provider 125. User data (e.g., user attributes, session information, user profile data, etc.) may be received from the user information provider 125 and the user data may be included in the callback instructions for the personalized content fragment. In an example, the user identification information may include a user identification token obtained from the content delivery network.

Webpage fragments may be retrieved using page identifiers. In an example, the webpage template may be obtained from the managed content provider 120 (or may be cached in the CDN) and the page identifier may be included in the callback instructions for the webpage fragment.

The webpage configuration engine 140 may configure the webpage using a webpage template. In an example, the webpage template may be obtained from the content delivery network. A webpage template configuration may be received from a content provider and the webpage template configuration may be used in configuring the webpage.

The content selector instruction generator 150 may select a personalized content fragment for the user from the set of personalized content fragments using the callback instructions from the personalized content fragment. The content selector instruction generator 150 may work in conjunction with the comparator instruction generator 155 to select the personalized content fragment to be rendered in the webpage as the personalized content fragment. In an example, the CDN may perform these tasks using edge-side server include (ESI) instructions generated and transmitted by the content selector instruction generator 150 and the comparator instruct generator 155. The callback instructions from the personalized content fragment may include a variety of conditional rules that may be used by the content delivery network to select a content item to be displayed in the webpage. In an example, the callback instructions from the personalized content fragment may include conditional logic and the personalized content fragment for the user may be selected using the conditional logic. For example, the conditional rules may indicate that if a user (Tom) likes blues music the user should receive personalized content fragment B. Tom's user information may indicate he likes blues music, and so personalized content fragment B may be selected for rendering into the requested webpage.

A variety of selection algorithms may be used in the conditional rules to effectuate appropriate selection of user content. For example, content may be associated with basic conditionals such as matching a user's designated market area with content for that designated market area or matching a user's loyalty tier with content for that loyalty tier. It will be understood that a variety of attributes may be used to select content. In an example, multiple attributes may be used to create a composite condition for selecting content for a user. The comparator instruction generator 155 may match against several variables such as, for example, user segments, attributes, audiences, session attributes, etc. In an example, the conditional logic may include a set of user attribute conditions and the personalized content fragment may be selected based on a match between members of a set of user attributes and members of the set of user attribute conditions. For example, Tom may have a blues music preference attribute included in his user information. The comparator instruction generator 155 may compare the user attribute to the rule to determine that the blues music preference matches the blues music rule in the conditional rules. The identification of the match may cause the content selector instruction generator 150 to select personalized content fragment A (e.g., the "likes blues music" personalized content fragment, etc.) to be selected for rendering in the webpage.

In another example, the conditional logic may include a priority tag and the personalized content fragment may be selected based on a match between a priority corresponding to the user and the priority tag. User content may be associated with a priority such as, for example, a user's ordered list of propensities or interests. This may allow content creators to generate a pool of content with each content item tagged with a propensity or interest. The CDN may use the conditional rules provided to the CDN to pull from the content pool based on the user's prioritized list of interests and propensities to purchase certain products. For example, Mary may have a user interest list and that may be matched to several content items. Mary may have ranked the interests on the interest list and she may receive personalized content fragment B because it is tagged with the highest ranked interest in Mary's interest list.

In yet another example, the conditional logic may include randomization logic and the personalized content fragment may be selected using the randomization logic. Content may be selected randomly from a pool of content. For example, consistent random selection for a single user may use a consistent random seed which may be stored with the user so that the user may receive a consistent experience by seeding the random selection with the user's saved random seed. In an example, this may be used as a baseline for A/B testing (e.g., split testing, etc.) where two variants of a webpage may be presented to users at random to determine which variant produces more favorable results. In another example, random content selection may be used in multivariate testing that may include multiple A/B tests or a test with many variations (e.g., tests A, B, C, D, E, F, etc.).

The selected personalized content fragment may be transmitted to the content delivery network via the content delivery network connector 130. The content delivery network may use the selected personalized content fragment and the callback instructions for the webpage fragment to render and deliver the webpage to the user. For example, the CDN may render the webpage for Tom including the webpage fragment A and the personalized content fragment A and may transmit the rendered page to the browser of a computing device used by Tom. The CDN may render the webpage for Mary using webpage fragment A and personalized content fragment B. This provides Tom and Mary with personalized webpages with some overlapping generalized content and personalized content fragment personally selected for them based on their user information.

In an example, user information may be unavailable for the user requesting the webpage. The user may be provided with a default personalized content fragment (e.g., general interest personalized content fragment, etc.), a random personalized content fragment, may use an alternate content selection rule included in the callback instructions for the personalized content fragment, etc.

Figure 2:
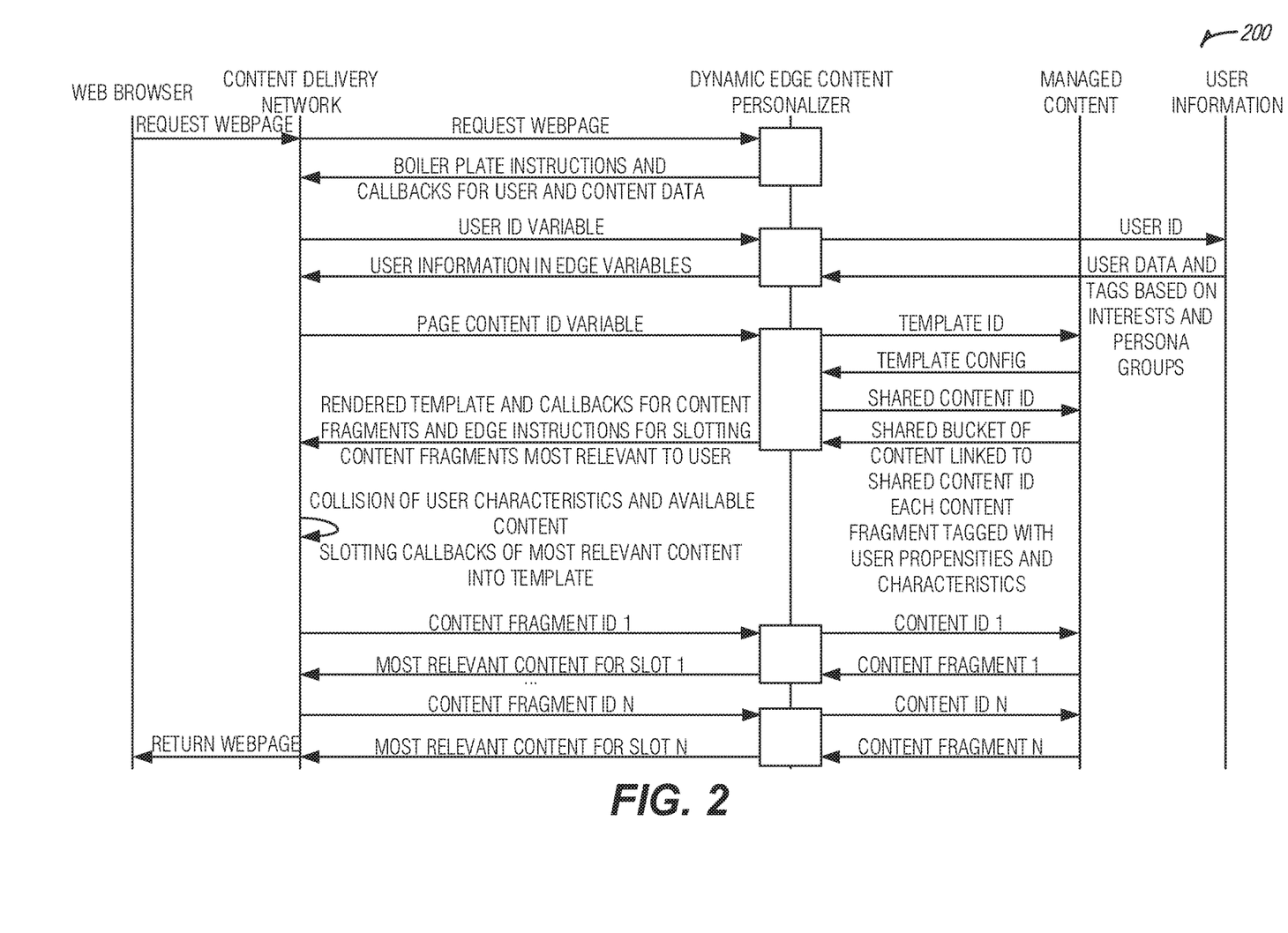
FIG. 2 is a swim lane diagram of an example of a data flow for dynamic edge content personalization, according to an embodiment.

FIG. 2 is a swim lane diagram of an example of a data flow 200 for dynamic edge content personalization, according to an embodiment. The data flow 200 may provide features as described in FIG. 1. The data flow may begin when a user requests a webpage via a web browser. The request may be received by a CDN. The CDN may be a collection of content delivery servers hosting an edge content cache from which content may be delivered to the user. The CDN may use location information of the user to deliver the content from an edge cache that is closest to the user to reduce network segments that the content may traverse. For example, the user may be requesting the webpage from New York and the content for the webpage may be retrieved from an edge cache located in a New York data center and used to render the webpage and deliver the webpage to a web browser executing on a computing device of the user.

The CDN may forward the request to a dynamic edge content personalizer that may transmit boilerplate instructions and callback for user and content data back to the CDN. The instructions and callbacks may be used by the CDN to retrieve content fragments that may be used to render the webpage for the user. The webpage may include a variety of webpage fragments that may define general content and personalized content fragment that may define content that may be personalized for the user.

The CDN may collect user identification information and may pass the user identification information on to the dynamic edge content personalizer. The dynamic edge cache content personalizer may use the user identification information to access user information for the user. The user information may include a variety of data such as, for example, user attributes, interest tags, persona information, group membership information, etc. The dynamic edge cache personalizer may select user information to forward to the CDN in edge variables. The edge variables may be used by the CDN to select personalized content from a pool of content items for users with certain user information (or user attributes).

The CDN may transmit a page content identification variable to the dynamic edge content personalizer for the requested webpage. The dynamic edge content personalizer may obtain a template identifier that corresponds to the content identification variable and may transmit the template identifier to a managed content provider. The managed content provider may select a template configuration based on the template identifier and may transmit the template configuration to the dynamic edge content personalizer.

The dynamic edge content personalizer may use the template configuration to identify a personalized content identifier for a personalized content fragment to be used in rendering the webpage. The shared content identifier may be transmitted to the managed content provider. The managed content provider may use the shared content identifier to select a pool of shared content that is linked to the shared content identifier. Each content fragment in the bucket may be tagged with user propensities, characteristics, etc.

The dynamic edge content personalizer may render (e.g., configure, etc.) the template and callbacks for the content fragments and may provide edge instructions for slotting (e.g., selecting for inclusion in the rendered webpage, etc.) content fragments most relevant to the user based on the user information. The dynamic edge content personalizer may transmit the callback instructions to the CDN. The CDN may then use the instructions to perform a collision of user information and available content. For example, the collision may identify content items with characteristics that are similar to those included in the user information. The most similar content fragment may be slotted into the template for retrieval using some or all of the callback instructions.

The CDN may then transmit a content identifier for each personalized content fragment slot included in the webpage template to the dynamic edge content personalizer. The dynamic edge content personalizer may then pass the content identifier to the managed content provider. The managed content provider may transmit the content fragment to the dynamic edge content personalizer which may in turn transmit the content fragment to the CDN (and may also transmit caching directives for this content fragment to the CDN as part of this same response) for rendering in the webpage for the user in its defined slot according to the template. The CDN may then render the webpage using the content fragments and may deliver the webpage to the browser of the user with the content fragments selected for the user.

Figure 3:
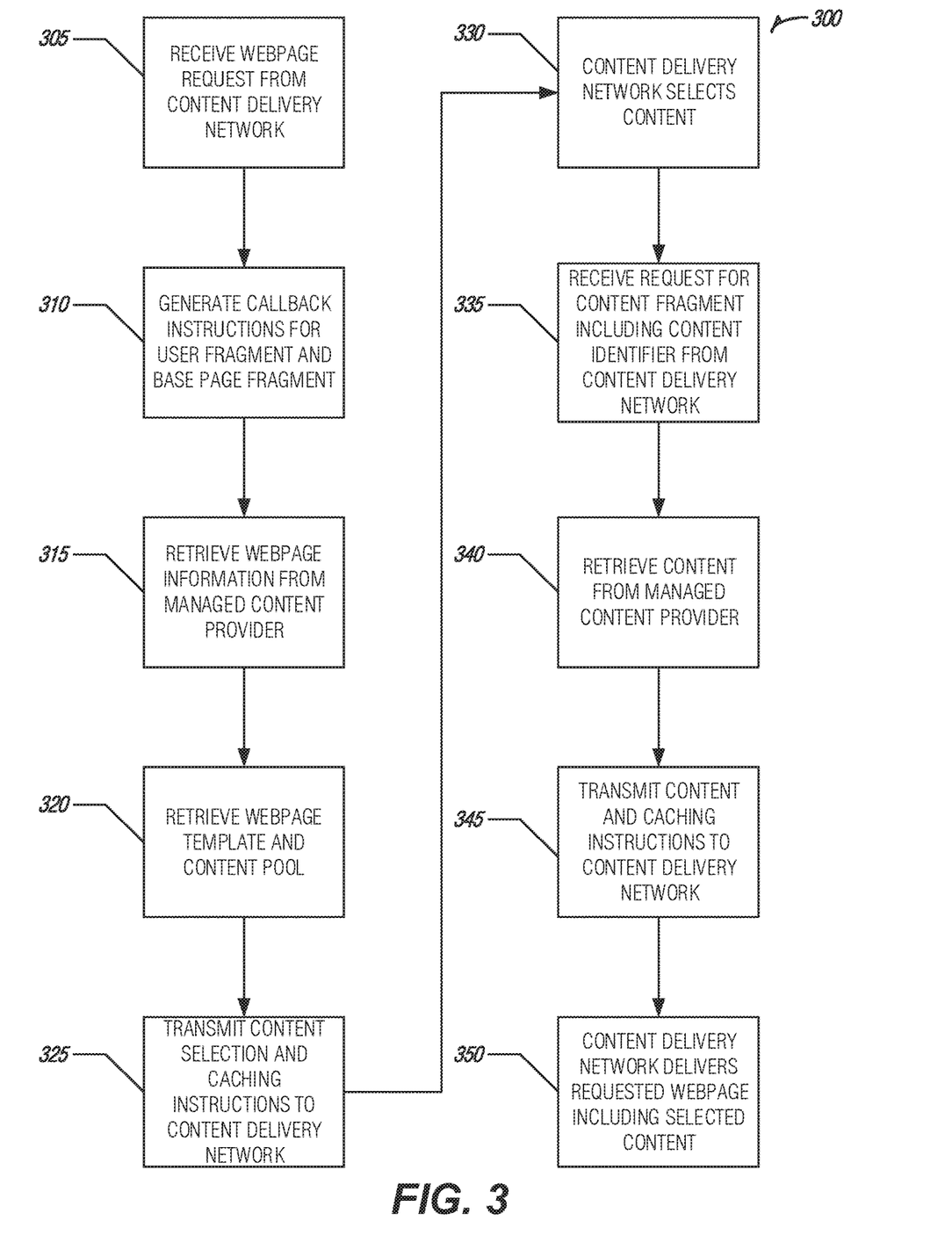
FIG. 3 is a flow diagram of an example of a process for dynamic edge content personalization, according to an embodiment.

FIG. 3 is a flow diagram of an example of a process 300 for dynamic edge content personalization, according to an embodiment. The process 300 may provide features as described in FIGS. 1 and 2. At operation 305, a webpage request may be received from a content delivery network. The webpage request may be received by the content delivery network from a web browser of a user requesting the webpage. At operation 310, callback instructions may be generated for a user fragment and a base page fragment. The user fragment may define user information that is to be personalized for the user and the base page fragment may define general content to be provided to most users. The callback instructions may include rules used by the content delivery network to select and retrieve content for use in rendering the webpage for delivery to the web browser of the user.

At operation 315, webpage information may be retrieved from a managed content provider. At operation 320, the webpage information may be used to retrieve a webpage template and a pool of content from which one or more personalized content fragments may be selected. The webpage template may define slots for the one or more personalized content fragments. At operation 325, content selection and caching instructions and may be transmitted to the content delivery network. The content selection instructions may be used by the content delivery network to select the one or more personalized content fragments from the content pool for inclusion in the rendered webpage.

At operation 330, the content delivery network may use the content selection instructions to select the one or more personalized content fragments. In an example, the CDN may retrieve one or more content items from its cache. At operation 335, a request may be received for the one or more content items (e.g., content fragments, etc.) from the content delivery network. The request may include a content identifier. At operation 340, the one or more content items may be retrieved from the managed content provider. For example, the one or more content items may be retrieved using their respective content identifiers. At operation 345, the one or more content items may be transmitted to the content delivery network along with caching instructions. At operation 350, the content delivery network renders the webpage using the one or more personalized content fragments and delivers the requested webpage to the web browser of the user.

Figure 4:
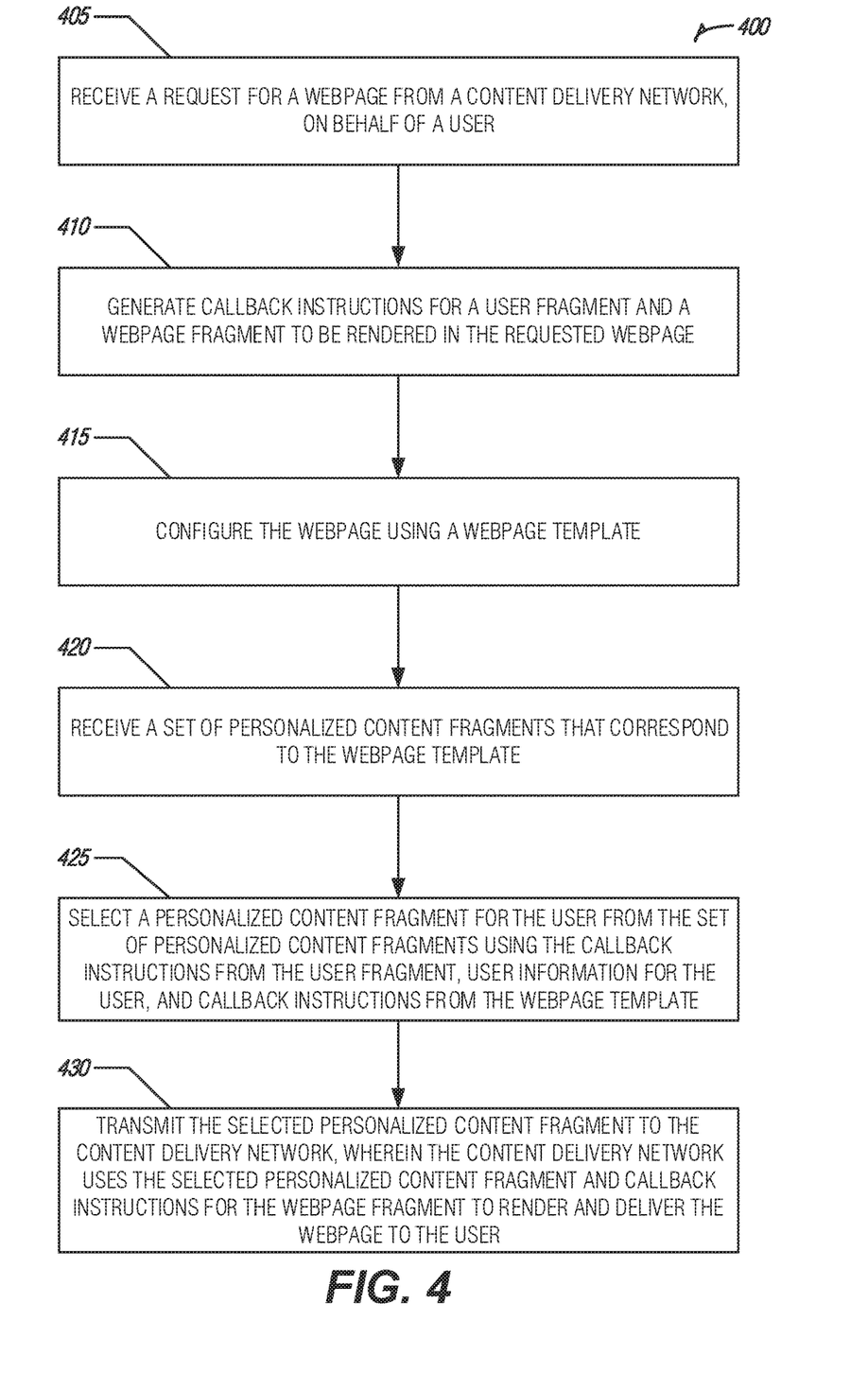
FIG. 4 is a flow diagram of an example of a method for dynamic edge content personalization, according to an embodiment.

FIG. 4 is a flow diagram of an example of a method 400 for dynamic edge content personalization, according to an embodiment. The method 400 may provide features as described in FIGS. 1, 2, and 3.

A request for a webpage may be received from a content delivery network (e.g., via the content delivery network connector 130 as described in FIG. 1, etc.) on behalf of a user (e.g., at operation 405).

Callback instructions may be generated (e.g., by the callback instruction generator 135 as described in FIG. 1, etc.) for a user fragment and a webpage fragment to be rendered in the requested webpage (e.g., at operation 410). In an example, user identification information may be obtained for the user. The user identification information may be transmitted to a user information provider. User data may be retrieved from a user information provider and the user data may be included in the callback instructions from the user fragment. In an example, additional directives (e.g., edge-side server includes (ESIs) may be transmitted to the CDN along with the callback instructions. For example, directives that create variables in the CDN and store data within those variables may be transmitted to the CDN. In an example, the user identification information includes a user identification token obtained from the content delivery network. In another example, a page identifier for the webpage fragment may be obtained from the content delivery network and the page identifier may be included in the callback instructions for the webpage fragment.

The webpage may be configured (e.g., by the webpage configuration engine 140 as described in FIG. 1, etc.) using a webpage template (e.g., at operation 415). In an example, the webpage template may be obtained from the content provider. A webpage template configuration for the webpage template may be obtained from a content provider and the webpage template configuration may be used to configure the webpage.

A set of personalized content fragments may be received (e.g., via the managed content connector 145 as described in FIG. 1, etc.) that correspond to the webpage template (e.g., at operation 420). In an example, the personalized content fragments may correspond to the user data stored in the CDN by the user fragment. A personalized content fragment may be selected (e.g., by the content selector instruction generator 150 in conjunction with the comparator instruction generator 155 as described in FIG. 1, etc.) for the user from the set of personalized content fragments using the callback instructions from the user fragment and callback instructions from the webpage template (e.g., at operation 425). In an example, the callback instructions for the user fragment may include conditional logic and selection of the personalized content fragment for the user may use the conditional logic. In an example, the conditional logic may include a set of user attribute conditions and the personalized content fragment may be selected based on a match between members of a set of user attributes and members of the set of user attribute conditions. In another example, the conditional logic may include a priority tag and the personalized content fragment may be selected based on a match between a priority corresponding to the user and the priority tag. In yet another example, the conditional logic may include randomization logic and the personalized content fragment may be selected using the randomization logic. The selected personalized content fragment may be transmitted (e.g., via the content delivery network connector 130 as described in FIG. 1, etc.) to the content delivery network (e.g., at operation 430). The content delivery network may use the selected personalized content fragment and callback instructions for the webpage fragment to render and deliver the webpage to the user.

Figure 5:
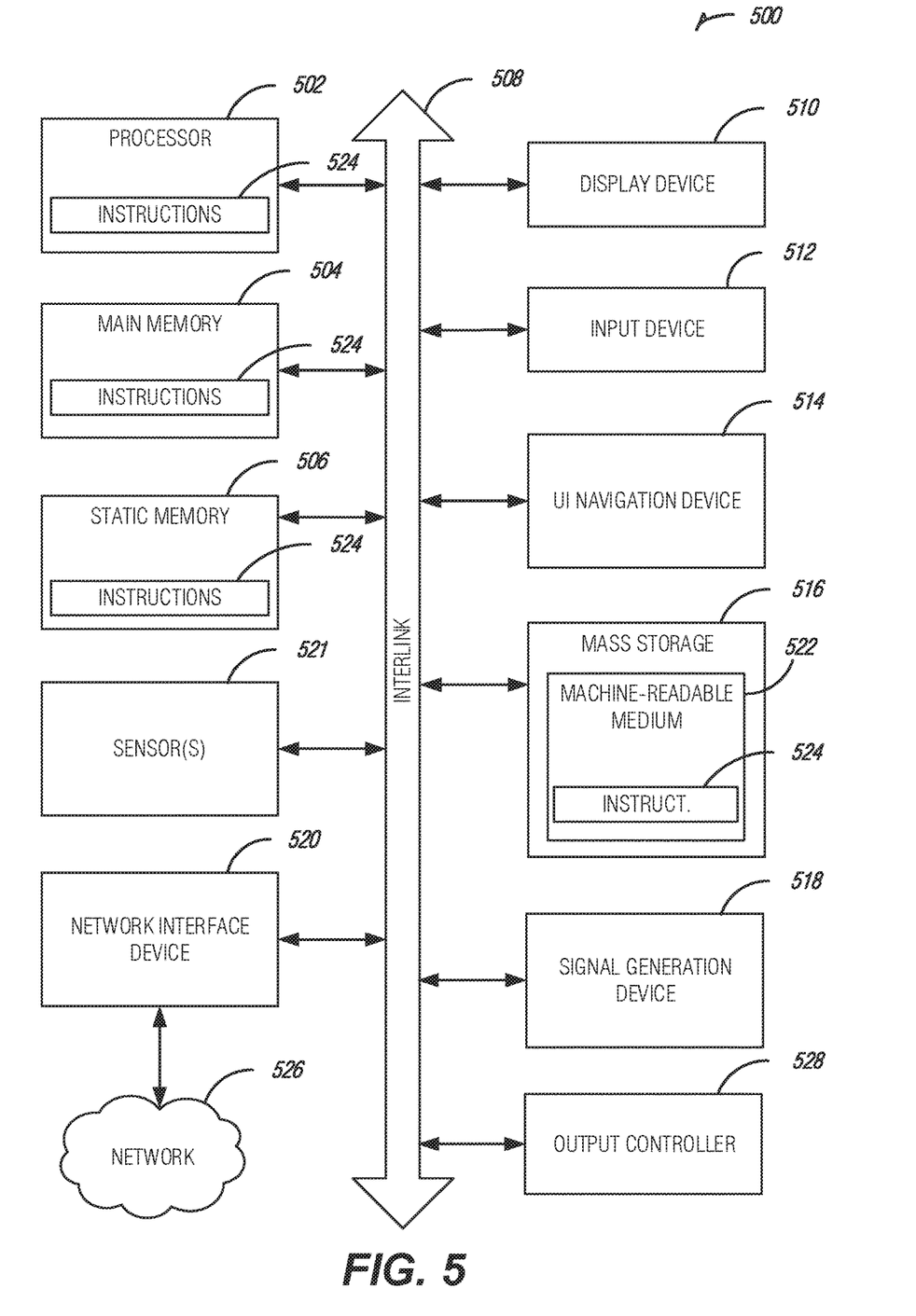
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for personalized web content delivery, the system comprising:
   at least one processor; and
   memory including instructions that, when executed by the at least one processor, cause the at least one processor to perform operations to:
   receive a request for a webpage from a content delivery network, on behalf of a user;
   generate callback instructions for a user fragment and a webpage fragment to be rendered in the requested webpage, wherein the callback instructions from the user fragment include conditional logic;
   configure the webpage using a webpage template;
   receive a set of personalized content fragment identifiers for a set of personalized content fragments cached in an edge cache of the content delivery network that correspond to the webpage template;
   automatically select a personalized content fragment for the user from the cached set of personalized content fragments using the conditional logic included in the callback instructions from the user fragment, user information of the user, callback instructions from the webpage template, and the set of personalized content identifiers, wherein the conditional logic processes the user information to produce selection criteria, and wherein the selection criteria is used to determine the personalized content fragment to select based on the set of personalized content identifiers as indicated by the callback instructions from the webpage template; and
   transmit the selected personalized content fragment to the content delivery network, wherein the content delivery network renders and delivers the webpage to the user by retrieving the selected personalized content fragment from the edge cache using callback instructions for the webpage fragment.

2. The system of claim 1, wherein the instructions to generate callback instructions for the user fragment and the webpage fragment further:
   obtain user identification information for the user;
   transmit the user identification information to a user information provider;
   receive user data from the user information provider; and
   include the user data in the callback instructions for the user fragment.

3. The system of claim 2, wherein the user identification information includes a user identification token obtained from the content delivery network.

4. The system of claim 1, wherein the instructions to generate callback instructions for the user fragment and the webpage fragment further:
   obtain a page identifier for the webpage fragment from the content delivery network; and
   include the page identifier in the callback instructions for the webpage fragment.

5. The system of claim 1, wherein the instructions to configure the webpage using the callback instructions for the user fragment and the webpage fragment further:
   obtain the webpage template from the content delivery network; and
   receive a webpage template configuration for the webpage template from a content provider, wherein the webpage template configuration is used to configure the webpage.

6. The system of claim 1, wherein the callback instructions from the user fragment include conditional logic and the instructions to select the personalized content fragment for the user includes instructions to use the conditional logic.

7. The system of claim 6, wherein the conditional logic includes a set of user attribute conditions and the personalized content fragment is selected based on a match between members of a set of user attributes and members of the set of user attribute conditions.

8. The system of claim 6, wherein the conditional logic includes a priority tag and the personalized content fragment is selected based on a match between a priority corresponding to the user and the priority tag.

9. The system of claim 6, wherein the conditional logic includes randomization logic and the personalized content fragment is selected using the randomization logic.

10. At least one non-transitory machine-readable medium including instructions for personalized web content delivery that, when executed by at least one processor, cause the at least one processor to perform operations to:
    receive a request for a webpage from a content delivery network for a user;
    generate callback instructions for a user fragment and a webpage fragment to be rendered in the requested webpage, wherein the callback instructions from the user fragment include conditional logic;
    configure the webpage using a webpage template;
    receive a set of personalized content fragment identifiers for a set of personalized content fragments cached in an edge cache of the content delivery network that correspond to the webpage template;
    automatically select a personalized content fragment for the user from the set of personalized content fragments using the conditional logic included in the callback instructions from the user fragment, user information of the user, callback instructions from the webpage template, and the set of personalized content identifiers, wherein the conditional logic processes the user information to produce selection criteria, and wherein the selection criteria is used to determine the personalized content fragment to select based on the set of personalized content identifiers as indicated by the callback instructions from the webpage template; and
    transmit the selected personalized content fragment to the content delivery network, wherein the content delivery network renders and delivers the webpage to the user by retrieving the selected personalized content fragment from the edge cache using callback instructions for the webpage fragment to render and deliver the webpage to the user.

11. The at least one non-transitory machine-readable medium of claim 10, wherein the instructions to generate callback instructions for the user fragment and the webpage fragment further comprises instructions that cause the at least one processor to perform operations to:
    obtain user identification information for the user;
    transmit the user identification information to a user information provider;
    receive user data from the user information provider; and
    include the user data in the callback instructions for the user fragment.

12. The at least one non-transitory machine-readable medium of claim 11, wherein the user identification information includes a user identification token obtained from the content delivery network.

13. The at least one non-transitory machine-readable medium of claim 10, wherein the instructions to generate callback instructions for the user fragment and the webpage fragment further comprises instructions that cause the at least one processor to perform operations to:
    obtain a page identifier for the webpage fragment from the content delivery network; and
    include the page identifier in the callback instructions for the webpage fragment.

14. The at least one non-transitory machine-readable medium of claim 10, wherein the instructions to configure the webpage using the callback instructions for the user fragment and the webpage fragment further comprises instructions that cause the at least one processor to perform operations to:
    obtain the webpage template from the content delivery network; and
    receive a webpage template configuration for the webpage template from a content provider, wherein the webpage template configuration is used to configure the webpage.

15. The at least one non-transitory machine-readable medium of claim 10, wherein the callback instructions from the user fragment include conditional logic and the instructions to select the personalized content fragment for the user includes instructions to use the conditional logic.

16. A method for personalized web content delivery, the method comprising:
    receiving a request for a webpage from a content delivery network for a user;
    generating callback instructions for a user fragment and a webpage fragment to be rendered in the requested webpage, wherein the callback instructions from the user fragment include conditional logic;
    configuring the webpage using a webpage template;
    receiving a set of personalized content fragment identifiers for a set of personalized content fragments cached in an edge cache of the content delivery network corresponding to the webpage template;

automatically selecting a personalized content fragment for the user from the set of personalized content fragments using the conditional logic included in the callback instructions from the user fragment, user information of the user, callback instructions from the webpage template, and the set of personalized content identifiers, wherein the conditional logic processes the user information to produce selection criteria, and wherein the selection criteria is used to determine the personalized content fragment to select based on the set of personalized content identifiers as indicated by the callback instructions from the webpage template; and transmitting the selected personalized content fragment to the content delivery network, wherein the content delivery network renders and delivers the webpage to the user by retrieving the selected personalized content fragment from the edge cache using callback instructions for the webpage fragment to render and deliver the webpage to the user.

17. The method of claim 16, wherein generating callback instructions for the user fragment and the webpage fragment further comprises:

obtaining user identification information for the user;

transmitting the user identification information to a user information provider;

receiving user data from the user information provider; and including the user data in the callback instructions for the user fragment.

18. The method of claim 17, wherein the user identification information includes a user identification token obtained from the content delivery network.

19. The method of claim 16, wherein generating callback instructions for the user fragment and the webpage fragment further comprises:

obtaining a page identifier for the webpage fragment from the content delivery network; and including the page identifier in the callback instructions for the webpage fragment.

20. The method of claim 16, wherein configuring the webpage using the callback instructions for the user fragment and the webpage fragment further comprises:

obtaining the webpage template from the content delivery network; and receiving a webpage template configuration for the webpage template from a content provider, wherein the webpage template configuration is used in configuring the webpage.

21. The method of claim 16, wherein the callback instructions from the user fragment include conditional logic and selecting the personalized content fragment for the user includes using the conditional logic.

* * * * *